(12) United States Patent
Seibert

(10) Patent No.: US 8,915,504 B1
(45) Date of Patent: Dec. 23, 2014

(54) WHEELED TOOL CADDY APPARATUS

(71) Applicant: Robert P. Seibert, Del Ray Beach, FL (US)

(72) Inventor: Robert P. Seibert, Del Ray Beach, FL (US)

( * ) Notice: Subject to any disclaimer, the term of this patent is extended or adjusted under 35 U.S.C. 154(b) by 0 days.

(21) Appl. No.: 13/764,057

(22) Filed: Feb. 11, 2013

(51) Int. Cl.
*B62B 3/00* (2006.01)
*B62B 1/10* (2006.01)

(52) U.S. Cl.
CPC . *B62B 3/005* (2013.01); *B62B 1/10* (2013.01); *B62B 3/008* (2013.01); *B62B 2301/08* (2013.01)
USPC ............ 280/47.35; 280/47.16; 280/47.2

(58) Field of Classification Search
CPC ............ B62B 1/002; B62B 1/08; B62B 1/10; B62B 1/16; B62B 3/008; B62B 2301/08; A45C 5/14
USPC .............................. 280/47.16, 47.2, 783, 769
See application file for complete search history.

(56) References Cited

U.S. PATENT DOCUMENTS

| 1,478,913 | A | * | 12/1923 | Rhodes | 248/129 |
|---|---|---|---|---|---|
| D182,716 | S | * | 5/1958 | Ferguson | D34/21 |
| 3,861,703 | A | * | 1/1975 | Gould | 280/47.131 |
| 3,874,531 | A | * | 4/1975 | Mayo | 414/680 |
| 4,435,115 | A | * | 3/1984 | Orstad et al. | 414/490 |
| 4,726,602 | A | * | 2/1988 | Sanders et al. | 280/654 |
| 4,822,116 | A | * | 4/1989 | Relyea et al. | 312/209 |
| 4,846,485 | A | * | 7/1989 | Payne | 280/47.18 |
| 4,858,940 | A | * | 8/1989 | Cheng | 280/5.2 |
| 4,976,450 | A | * | 12/1990 | Ellefson | 280/79.11 |
| 4,993,551 | A | * | 2/1991 | Lindsay | 206/373 |
| 5,174,447 | A | * | 12/1992 | Fleming | 206/373 |
| 5,378,005 | A | * | 1/1995 | Norton | 280/47.26 |
| 5,452,908 | A | * | 9/1995 | Bencic | 280/47.35 |
| 5,573,089 | A | * | 11/1996 | Liang | 190/18 A |
| 5,743,607 | A | * | 4/1998 | Teufel et al. | 312/265.2 |
| 5,799,958 | A | * | 9/1998 | Bishop | 280/47.26 |
| 5,893,572 | A | | 4/1999 | Parks | |
| 6,027,128 | A | * | 2/2000 | Stich et al. | 280/47.16 |
| 6,170,839 | B1 | | 1/2001 | Kizewski | |
| 6,439,585 | B1 | * | 8/2002 | Tan | 280/47.26 |
| 6,446,987 | B2 | * | 9/2002 | Abraham et al. | 280/47.2 |
| 6,702,168 | B2 | * | 3/2004 | Panosian | 224/583 |
| 6,935,641 | B2 | * | 8/2005 | Hahn | 280/47.19 |
| 6,945,546 | B2 | | 9/2005 | Guirlinger | |
| 7,044,569 | B1 | * | 5/2006 | Relyea et al. | 312/249.11 |
| 7,083,174 | B2 | * | 8/2006 | Kane | 280/47.2 |
| 7,314,134 | B2 | * | 1/2008 | Redzisz | 206/373 |
| 7,328,905 | B2 | * | 2/2008 | Guirlinger | 280/47.19 |
| 7,431,313 | B1 | * | 10/2008 | Torres et al. | 280/47.26 |

(Continued)

*Primary Examiner* — J. Allen Shriver, II
*Assistant Examiner* — Steve Clemmons
(74) *Attorney, Agent, or Firm* — Crossley Patent Law

(57) ABSTRACT

A wheeled tool caddy apparatus that includes a caddy frame having a first and a second vertical member disposed in parallel, a toolbox distally disposed endwise upon each of the first and second vertical members, and a cubical open-topped receptacle removably disposed upon the tool box, wherein an extant collection of tools is sortable, storable, and portable within the tool box, the open-topped receptacle, and each of a plurality of fabric tool pockets disposed upon at least three sides of the open-topped receptacle, whereby said wheeled tool caddy apparatus is maneuverable in an upright position upon a quadruplicity of castor wheels disposed upon a base of the toolbox, and in an inclined orientation upon a pair of castor wheels disposed upon a first vertical surface of the toolbox, and directable thereby by means of a U-shaped handle section adjustably extensible from within each of the first and second vertical sections.

10 Claims, 5 Drawing Sheets

(56) References Cited

U.S. PATENT DOCUMENTS

| | | | |
|---|---|---|---|
| 7,434,819 B1* | 10/2008 | Dunavin | 280/47.35 |
| 7,503,569 B2* | 3/2009 | Duvigneau | 280/47.18 |
| 7,661,685 B2* | 2/2010 | Thibault | 280/47.35 |
| 7,905,502 B2* | 3/2011 | Oliver | 280/47.18 |
| 8,226,092 B2* | 7/2012 | Oliver | 280/47.18 |
| 8,376,376 B2* | 2/2013 | Thibault | 280/79.5 |
| 8,668,209 B1* | 3/2014 | Anzivino et al. | 280/47.12 |
| 2001/0035704 A1* | 11/2001 | Dierbeck | 312/902 |
| 2005/0159784 A1* | 7/2005 | Arceta | 607/20 |
| 2005/0269792 A1* | 12/2005 | Aronson | 280/79.11 |
| 2006/0006621 A1* | 1/2006 | Santa Cruz et al. | 280/79.3 |
| 2006/0144732 A1* | 7/2006 | Kaplan et al. | 206/349 |
| 2007/0194543 A1* | 8/2007 | Duvigneau | 280/47.26 |
| 2007/0235959 A1* | 10/2007 | Smith | 280/32.6 |
| 2008/0128305 A1* | 6/2008 | Guirlinger | 206/372 |
| 2009/0301913 A1* | 12/2009 | Scaletta et al. | 206/373 |
| 2010/0289236 A1* | 11/2010 | Bennett et al. | 280/79.11 |
| 2010/0295430 A1* | 11/2010 | Cheng | 312/249.11 |
| 2011/0127736 A1* | 6/2011 | Oliver | 280/47.17 |
| 2012/0292870 A1* | 11/2012 | Cowie et al. | 280/79.3 |
| 2013/0118818 A1* | 5/2013 | Smith | 180/19.1 |

* cited by examiner

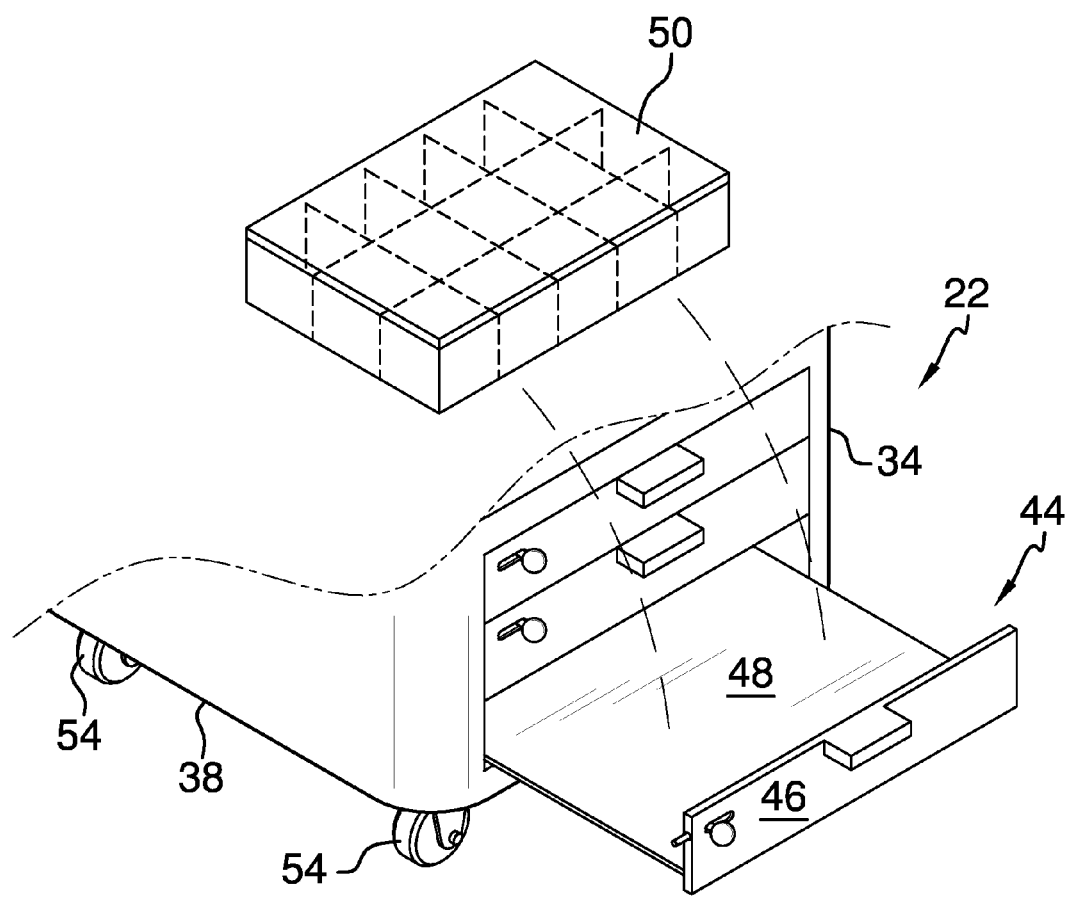
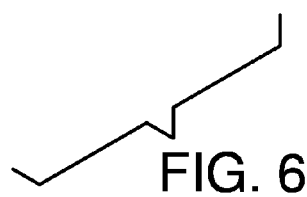

WHEELED TOOL CADDY APPARATUS

BACKGROUND OF THE INVENTION

Various types of wheeled tool storage devices are known in the prior art. However, what is needed is a wheeled tool caddy apparatus that includes a caddy frame having a first and a second vertical member disposed in parallel, a toolbox distally disposed endwise upon each of the first and second vertical members, and a cubical open-topped receptacle removably disposed upon the tool box, wherein a collection of tools is sortable, storable, and portable within the tool box, the open-topped receptacle, and each of a plurality of fabric tool pockets disposed upon at least three sides of the open-topped receptacle, whereby said wheeled tool caddy apparatus is maneuverable in an upright position upon a quadruplicity of castor wheels disposed upon a base of the toolbox, and in an inclined orientation upon a pair of castor wheels disposed upon a first vertical surface of the toolbox, and directable thereby by means of a U-shaped handle section adjustably extensible from within each of the first and second vertical sections.

FIELD OF THE INVENTION

The present invention relates to a wheeled tool caddy apparatus, and more particularly, to a wheeled tool caddy apparatus that includes a caddy frame having a first and a second vertical member disposed in parallel, a toolbox distally disposed endwise upon each of the first and second vertical members, and a cubical open-topped receptacle removably disposed upon the tool box, wherein a collection of tools is sortable, storable, and portable within the tool box, the open-topped receptacle, and each of a plurality of fabric tool pockets disposed upon at least three sides of the open-topped receptacle, whereby said wheeled tool caddy apparatus is maneuverable in an upright position upon a quadruplicity of castor wheels disposed upon a base of the toolbox, and in an inclined orientation upon a pair of castor wheels disposed upon a first vertical surface of the toolbox, and directable thereby by means of a U-shaped handle section adjustably extensible from within each of the first and second vertical sections.

SUMMARY OF THE INVENTION

The general purpose of the wheeled tool caddy apparatus, described subsequently in greater detail, is to provide a wheeled tool caddy apparatus which has many novel features that result in a wheeled tool caddy apparatus which is not anticipated, rendered obvious, suggested, or even implied by prior art, either alone or in combination thereof.

The present wheeled tool caddy apparatus has been devised to enable ready portage and maneuverability of a collection of stored tools around a jobsite. In the present day, a variety of tools is needed when engaging in any construction activity, and many tools are repeatedly needed and used intermittently in combination with other tools and accoutrements. Wherefore, it is preferable to have accessible at all times a collated collection of tools.

Many carpenters, construction workers, and other personnel wear tool belts to keep at hand the most frequently used tools. However, some tools are simply too big or unwieldy for a tool belt, and others must be interchanged between another storage area and a tool belt, as needed, whereby frequent trips between a storage area and a jobsite or particular workpiece are needed. Moreover, most commonly, tools are simply collected for use, and then left proximal some jobsite unordered and unsorted. This results in lost and misplaced tools, and time wasted in search of a desired object between jobsites or workpieces.

The present invention, however, enables a user to maintain collated tools in desired arrangements and expediently move them between desired locations together, without having to sort, collect, remove or replace them from a fixed area. The present device enables mobility of a larger collection of tools and maintains expedient access to any one of a plurality of tools stored therein.

The present wheeled tool caddy apparatus, then, includes a caddy frame able to movably support a toolbox and an open-topped receptacle thereupon. The caddy frame includes a first vertical section disposed in parallel with a second vertical section, each of said first and second vertical sections attached to the toolbox by means of each of a respective first lower bracket and a second lower bracket attached at a first vertical side of the toolbox. A U-shaped handle is adjustably extensible vertically from within each of the first and second vertical sections.

The toolbox is generally cubical and includes a plurality of drawers partitioned and compartmentalized for collated storage of extant tools and accoutrements therein. The plurality of drawers includes a first plurality of drawers disposed on one of the vertical surfaces of the toolbox perpendicularly oriented relative the first vertical surface, and a second plurality of drawers disposed on an opposite vertical surface of the toolbox relative the first plurality of drawers. A sliding shelf unit is included in the first plurality of drawers, whereupon a compartmentalized storage box is removably stored. The sliding shelf unit includes a horizontal shelf configured to fit the compartmentalized storage box thereupon and a front wall configured to resemble the front of any one of the plurality of drawers.

The open-topped receptacle is removably disposed overlying the toolbox. The open-topped receptacle is also generally cubical and provides convenient storage for articles and tools in use during a particular job or other articles too large for storage within the toolbox plurality of drawers (for example, a large square or a level).

A plurality of fabric tool pockets is disposed on at least three of the vertical surfaces of the open-topped receptacle. The plurality of fabric tool pockets comprise pockets of various sizes and shapes suitable for storing common tools. The plurality of fabric tool pockets may resemble, to some degree, the particular pockets typical of present day tool belts, and includes pockets and holding straps and other fabric members usable to releasably contain various tool types, such as, among other examples, hammers, chisels, tape measures, pencils, and the like.

For mobility of the instant wheeled tool caddy apparatus, a quadruplicity of castor wheels is disposed on a base of the toolbox, each of said quadruplicity of castor wheels oriented to volubly support the wheeled tool caddy apparatus when the caddy frame is oriented in an upright position, with the caddy frame vertically oriented relative the ground. Thus, the instant wheeled tool caddy apparatus is maneuverable when in the upright position around a particular jobsite, as desired, whereby the arrangement of tools stored and ported by the device are conveniently accessible and readily arranged for expedient dispatch, as desired.

For portage of tools across longer distances, such as to and from a particular jobsite, or between specific work pieces, a pair of castor wheels is disposed on the first vertical surface of the toolbox proximal to each of the first and second lower brackets. Each of the pair of castor wheels is disposed to contact the ground when the caddy frame is tilted off the vertical relative the ground, and the first vertical surface of the toolbox is inclined over the particular ground surface. The pair of castor wheels thus volubly supports the instant wheeled tool caddy apparatus with the handle section positioned at an incline relative the ground whereby the toolbox and open-topped receptacle may be maneuvered at will with the bulk of the weight of the tools stored therein borne by the caddy frame.

Thus has been broadly outlined the more important features of the present wheeled tool caddy apparatus so that the detailed description thereof that follows may be better understood and in order that the present contribution to the art may be better appreciated.

Objects of the present wheeled tool caddy apparatus, along with various novel features that characterize the invention are particularly pointed out in the claims forming a part of this disclosure. For better understanding of the wheeled tool caddy apparatus, its operating advantages and specific objects attained by its uses, refer to the accompanying drawings and description.

BRIEF DESCRIPTION OF THE DRAWINGS

Figures
FIG. 6 is a detail view of a first plurality of drawers and a sliding shelf with removable compartmentalized storage box.

DETAILED DESCRIPTION OF THE DRAWINGS

Figure 1:
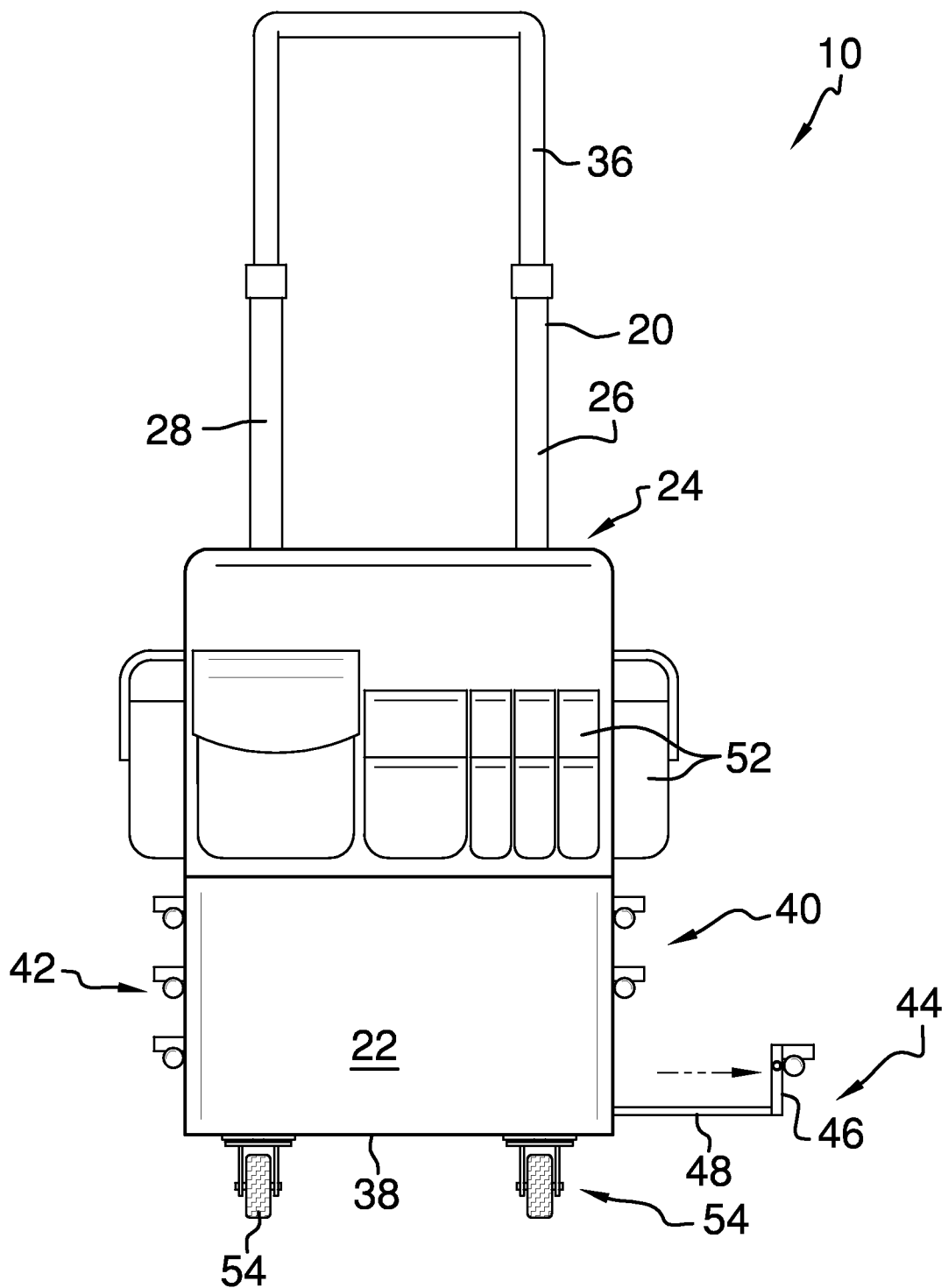
FIG. 1 is a front view.

With reference now to the drawings, and in particular FIGS. 1 through 6 thereof, example of the instant wheeled tool caddy apparatus employing the principles and concepts of the present wheeled tool caddy apparatus and generally designated by the reference number 10 will be described.

Referring to FIGS. 1 through 6 a preferred embodiment of the present wheeled tool caddy apparatus 10 is illustrated.

The present wheeled tool caddy apparatus 10 has been devised to enable convenient storage and portage of tools upon and around the jobsite. When working construction, a plurality of tools is frequently and repeatedly needed, whereupon most construction personnel maintain tool belts upon their person. However, some jobs require a variety of tools which may be too heavy to carry upon the person at all times. Moreover, means to store such a variety of tools can necessitate frequent trips to a specific location where such tools are stored and collated. Wherefore, the present device 10 enables maneuverable portage of stored tools convenient to a particular job or workpiece at hand.

The present wheeled tool caddy apparatus 10 includes a caddy frame 20 devised to maneuverably support a cubical toolbox 22 and an attachable open-topped receptacle 24 thereupon. A user is enabled to maneuver the toolbox 22 and open-topped receptacle 24, and any arrangement of tools collated therein, by use of the frame 20 as will be described subsequently.

The caddy frame 20 includes a first vertical section 26 and a second vertical section 28 disposed in parallel. A first lower bracket 30 is disposed distally endwise upon the first vertical section 26 and a second lower bracket 32 is disposed distally endwise upon the second vertical section 28. The second lower bracket 32 is disposed in parallel with the first lower bracket 30.

Figure 3:
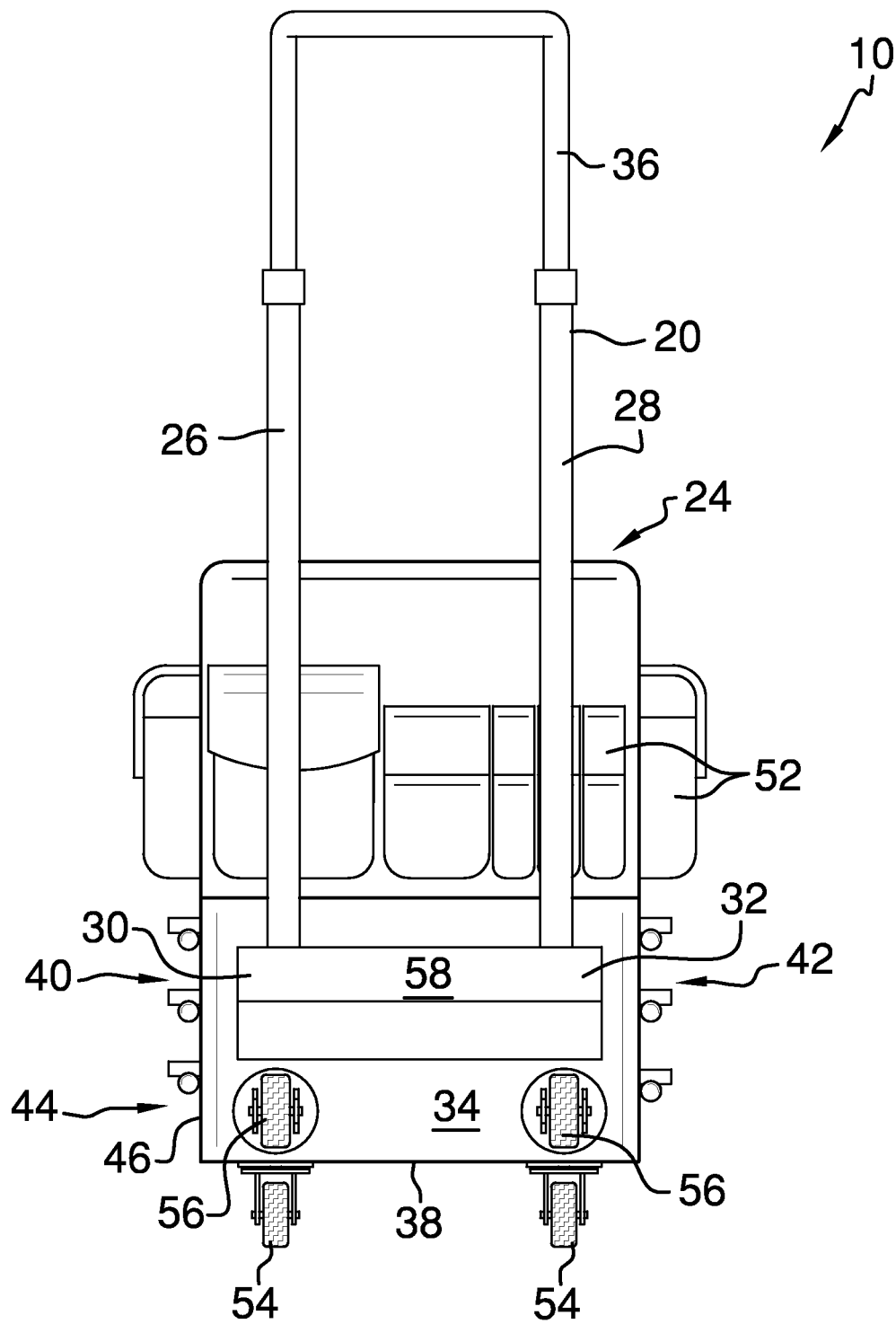
FIG. 3 is a back view.
Figure 4:
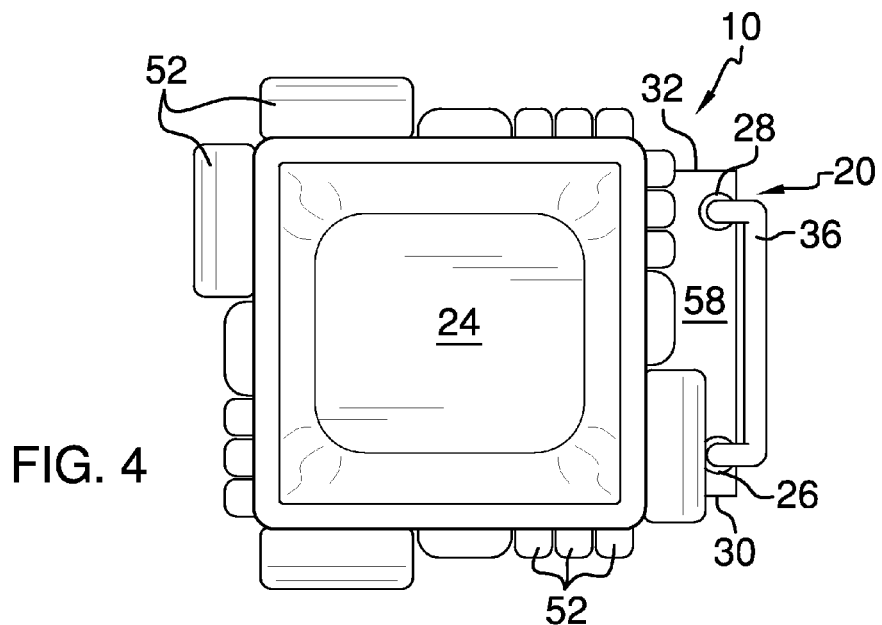
FIG. 4 is a top view.

Each of the first and second lower brackets 30, 32 is attached to a first vertical surface 34 of the toolbox 22. As shown in FIGS. 3 and 4, a horizontally disposed support strut 58 may be disposed between the first lower bracket 30 and the second lower bracket 32 to secure the caddy frame 20 to the first vertical surface 34 of the toolbox 22. A U-shaped handle section 36 is adjustably extensible from within both of the first vertical section 26 and second vertical section 28.

The toolbox 22 is disposed distally endwise upon the caddy frame 20. The toolbox 22 includes a base 38 disposed parallel to the ground when the frame 20 is in an upright position. The first vertical surface 34 is disposed perpendicularly relative the base 38. For collated storage of tools therein, the toolbox 22 includes a plurality of drawers, including a first plurality of drawers 40 disposed within one of the other vertical surfaces of the toolbox 22, and a second plurality of drawers 42 disposed within an opposite vertical surface relative the first plurality of drawers 40. Each of said plurality of drawers 40, 42 is partitioned and compartmentalized for the ordering and storage of various extant tools therein.

The first plurality of drawers 40 includes a sliding shelf unit 44 disposed most proximal the base 38. The sliding shelf unit 44 includes a front wall 46 disposed endwise upon a horizontal shelf 48. The front wall 46 is configured to lie flush with the fronts of the first plurality of drawers 40 when in a closed position, and resembles a drawer thereat.

As is illustrated in FIG. 6, a removable compartmentalized storage box 50 is storable upon the sliding shelf unit 44, and removable therefrom for collated storage of smaller articles and tools, such as nails, nuts and bolts, for example, or other sundries particular to a desired job at hand.

Figure 2:
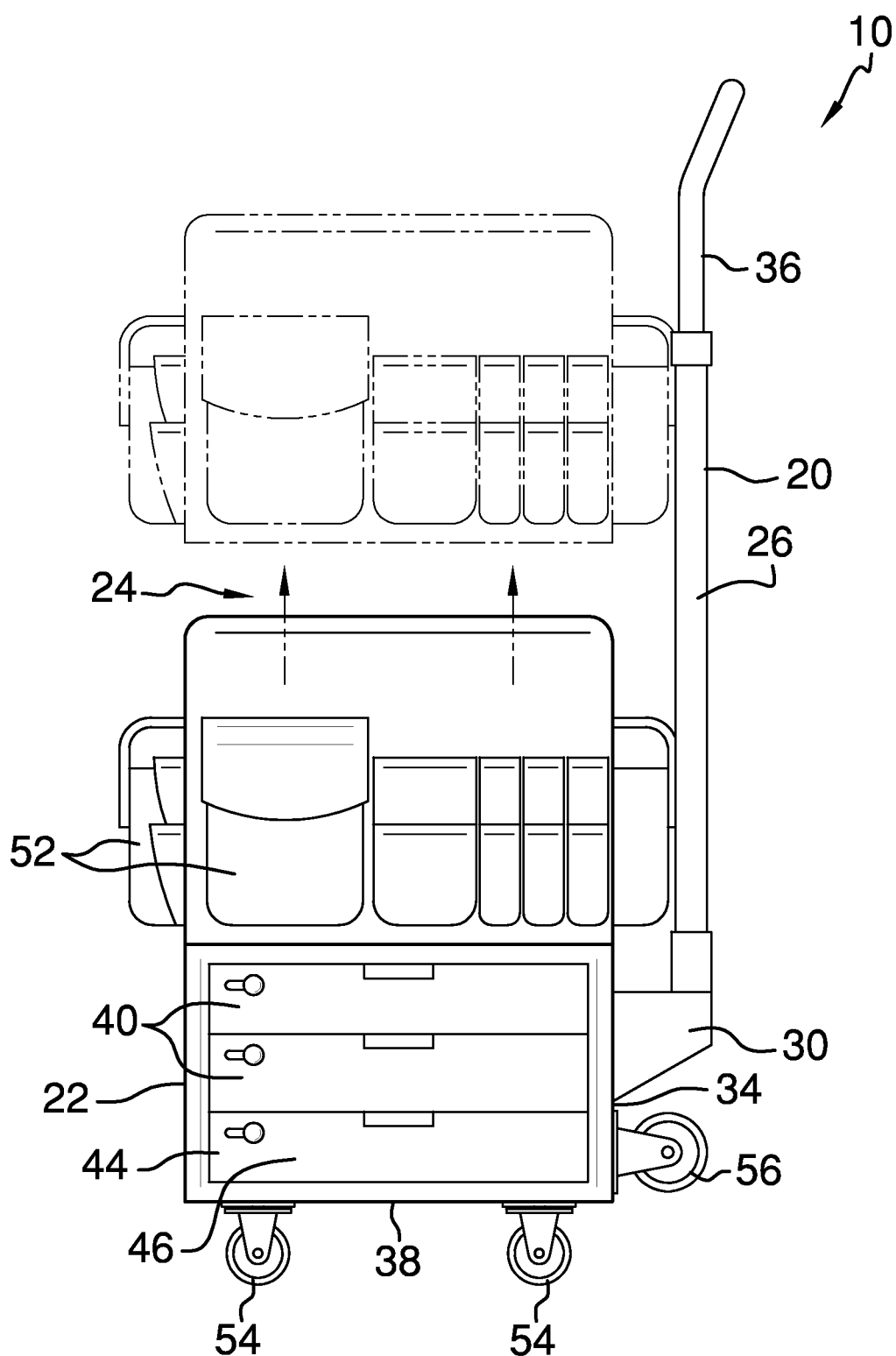
FIG. 2 is a side view.

The open-topped receptacle 24 is cubical and devised to removably rest atop the toolbox 22. Thus, as shown in FIG. 2, the open-topped receptacle 24 may be lifted up from the toolbox 22, as desired, and removed from the caddy frame 20 for convenient positioning proximal a particular jobsite or workpiece. The open-topped receptacle 24 may be slidably disposed upon the caddy frame 20 and releasably attachable thereto.

The open-topped receptacle 24 enables placement of various tools and accoutrements therein without partitioning for storage, and enables containment of larger articles (such as a square, or a level, for example, or other article too large for storage within the toolbox) as well as relevant tools frequently used intermittently such as are preferably maintained nearby for expedient access.

A plurality of fabric tool pockets 52 is disposed exteriorly upon at least three of the vertical surfaces of the open-topped receptacle 24. The plurality of fabric tool pockets 52 comprise a variety of different sized pockets, including open-topped and closeable pockets, whereby a number of extant tools and accoutrements may be conveniently stored between uses. The plurality of fabric tool pockets 52 is considered to be similar to the pockets and holding members typical of modern tool belts, whereby a user may readily transfer articles from an extant tool belt (not shown) to the plurality of fabric tool pockets 52 and therebetween, as desired.

For mobility, a quadruplicity of castor wheels 54 is disposed upon the toolbox 22 base 38, each of said quadruplicity of castor wheels 54 disposed to contact the ground when the caddy frame 20 is vertically oriented in the upright position. Thus, the instant wheeled tool caddy apparatus 10 is moveably supportable in an upright position, and readily repositioned as desired when working at a particular jobsite.

Figure 5:
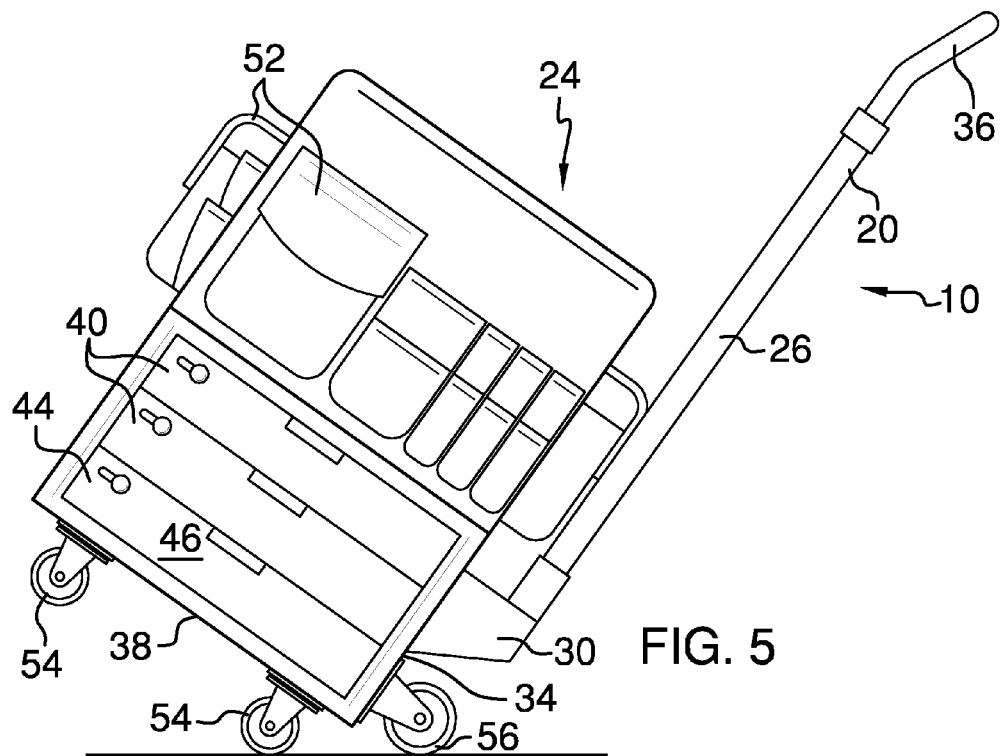
FIG. 5 is a side view with the device in an inclined position for maneuverability.

For maneuverability and mobility of the instant wheeled tool caddy apparatus 10 across longer distances than simple repositioning proximal a desired jobsite, a pair of castor wheels 56 is disposed upon the toolbox 22 first vertical surface 34 proximal to each of the first and second lower brackets 30, 32. As shown in FIG. 5, each of said pair of castor wheels 56 is oriented to contact the ground when the caddy frame 20 is tilted off the vertical by means of the handle section 36 whereby the wheeled tool caddy apparatus 10 is maneuverably supported on the pair of castor wheels 56 and two of the quadruplicity of castor wheels 54. Thusly, heavy tools, and a collection of stored and collated tools, can be expediently ported to a desired location for use thereat.

Thusly the toolbox 22 and plurality of fabric tool pockets 52 enable portable storage of extant tools collated in desired and convenient arrangements, the open-topped receptacle 24 may be removably secured upon the caddy frame 20, and the caddy frame 20 then inclined upon the pair of castor wheels 56 for convenient portage and maneuverability of a collection of tools to and around a jobsite.

What is claimed is:

1. A wheeled tool caddy apparatus comprising:
    a caddy frame;
    a toolbox disposed distally endwise upon the frame, said toolbox comprising a plurality of partitioned drawers therein;
    an attachable open-topped receptacle removably disposed overlying the toolbox, the open-topped receptacle having at least one of a vertical surface;
    a plurality of fabric tool pockets disposed exteriorly upon at least one of the vertical surfaces of the open-topped receptacle;
    a quadruplicity of castor wheels disposed underlying the toolbox, each of said quadruplicity of castor wheels supporting the wheeled tool caddy apparatus in an upright position with the frame vertically oriented; and
    a pair of castor wheels disposed upon the toolbox perpendicularly relative the quadruplicity of castor wheels, each of said pair of castor wheels oriented to contact the ground when the caddy frame is tilted off the vertical and the caddy frame is maneuvered;
    wherein the toolbox and plurality of fabric tool pockets enable portable storage of extant tools collated in desired and convenient arrangements, the open-topped receptacle is removably securable upon the caddy frame, and the caddy frame is inclinable upon the pair of castor wheels for convenient portage and maneuvering of tools around a jobsite.

2. The wheeled tool caddy apparatus of claim 1 wherein the caddy frame comprises a handle section telescopically disposed therein, said handle section adjustably extensible from within the caddy frame.

3. The wheeled tool caddy apparatus of claim 2 wherein the toolbox further comprises:
    a base;
    a first plurality of drawers;
    a second plurality of drawers; and
    a vertical first surface connected to the caddy frame;
    wherein the quadruplicity of castor wheels is disposed upon the base of the toolbox to volubly support the caddy frame in a vertical orientation.

4. The wheeled tool caddy apparatus of claim 3 wherein the caddy frame further comprises:
    a first lower bracket connected to the toolbox first surface;
    a second lower bracket connected parallel to the first lower bracket upon the toolbox first surface;
    a first vertical section connected perpendicularly upon the first lower bracket; and
    a second vertical section connected perpendicularly upon the second lower bracket, said second vertical section disposed in parallel with the first vertical section.

5. The wheeled tool caddy apparatus of claim 4 wherein the handle section is U-shaped and adjustably extensible from within both of the first and second vertical sections.

6. The wheeled tool caddy apparatus of claim 5 wherein the first plurality of drawers comprises a sliding shelf unit and a removable compartmentalized box storable thereupon.

7. The wheeled tool caddy apparatus of claim 6 wherein the plurality of fabric tool pockets comprises at least one large pocket, a medium-sized pocket, and a plurality of smaller pockets.

8. The wheeled tool caddy apparatus of claim 7 wherein the open-topped receptacle is cubical.

9. The wheeled tool caddy apparatus of claim 8 wherein the plurality of fabric tool pockets is disposed upon at least three of the vertical surfaces of the open-topped receptacle.

10. A wheeled tool caddy apparatus comprising:
    a caddy frame comprising:
        a first vertical section;
        a second vertical section disposed in parallel with the first vertical section;
        a first lower bracket disposed distally endwise upon the first vertical section;
        a second lower bracket disposed distally endwise upon the second vertical section, said second lower bracket disposed in parallel with the first lower bracket;
        a U-shaped handle section adjustably extensible from within both of the first vertical section and second vertical section;
    a cubical toolbox disposed distally endwise upon the caddy frame, said toolbox comprising:
        a base;
        a first vertical surface connected to both of the first and second lower brackets of the caddy frame;
        a first plurality of drawers including a sliding shelf unit having a removable compartmentalized storage box storable thereupon;
        a second plurality of drawers disposed upon an opposing surface relative the first plurality of drawers;
    a cubical open-topped receptacle removably disposed upon the caddy frame overlying the toolbox, the open-topped receptacle having at least three vertical surfaces;
    a plurality of fabric tool pockets disposed exteriorly upon at least three of the vertical surfaces of the open-topped receptacle;
    a quadruplicity of castor wheels disposed upon the toolbox base; and
    a pair of castor wheels disposed upon the toolbox first vertical surface proximal to each of the first and second lower brackets, each of said pair of castor wheels oriented to contact the ground when the caddy frame is tilted off the vertical by means of the caddy frame;
    wherein the toolbox and plurality of fabric tool pockets enable portable storage of extant tools collated in desired and convenient arrangements, the open-topped receptacle is removably securable upon the caddy frame, and the caddy frame is inclinable upon the pair of castor wheels for convenient portage and maneuvering of tools around a jobsite.

* * * * *